June 6, 1950 W. R. KOCH 2,510,640

STABILIZED HIGH-FREQUENCY AMPLIFIER

Filed May 31, 1946

INVENTOR
WINFIELD R. KOCH
BY H. S. Grover
ATTORNEY

Patented June 6, 1950 2,510,640

UNITED STATES PATENT OFFICE 2,510,640

STABILIZED HIGH-FREQUENCY AMPLIFIER

Winfield R. Koch, Haddonfield, N. J., assignor to Radio Corporation of America, a corporation of Delaware Application May 31, 1946, Serial No. 673,294

5 Claims. (Cl. 179—171)

My present invention relates to stabilized high frequency signal amplifier circuits, and more particularly to high frequency amplifiers stabilized against inherent input capacity variation.

In the past it has been noted that at high frequency variation the selective input circuit of a signal amplifier has its selectivity characteristic affected by changes in operating bias of the signal input, or control, grid of the amplifier electron tube. For example, when automatic volume control (AVC) is utilized in connection with a signal amplifier of high frequency signals, the tuned input circuit of the signal amplifier will actually be detuned in response to variation in magnitude of the AVC bias. Hence, it was proposed by A. Van der Zeil, U. S. Patent 2,212,851, granted August 27, 1940, to provide an unbypassed resistor in the cathode connection of the amplifier tube thereby to provide a means for minimizing the detuning of the selector input circuit of the amplifier caused by the AVC action. Such inclusion of an unbypassed cathode resistor is normally satisfactory, and provides a substantial measure of stabilization against the inherent input capacity variation caused in response to the changing of the amplifier control grid bias.

However, there are many situations encountered in high frequency apparatus where the use of an unbypassed cathode resistor has not been employed despite the fact that its use would have considerably aided in performance. In the case of a battery-operated radio receiver, for example, the tubes often employ filament type cathodes. In such cases it is essential that the filament of the amplifier tube be at ground potential. In the aforesaid Van der Zeil circuit the ground connection is made at the end of the cathode resistor remote from the cathode connection, and it has not been considered possible to use that circuit in connection with an amplifier employing a filament type cathode. Again, in the case of pentode tubes such as the 6SG7, where the suppressor grid is internally connected to the cathode, the grounding of the remote end of the unbypassed cathode resistor has been considered as an obstacle to use of that specific type of tube.

My present invention has as one of its main objects the provision of means for preventing changes in the selectivity curve of a high frequency signal amplifier input circuit caused by tube input capacity changes due to control grid bias variation, the amplifier circuit including a tube whose cathode is of the filament type, or a tube which includes a suppressor grid connected directly and internally to the cathode. In my novel and improved circuit the cathode element of the amplifier is directly connected to ground without in any way limiting the operation of the circuit with respect to the high frequency currents.

Another important object of this invention is to provide a high frequency signal amplifier whose control grid is subjected to AVC action and whose cathode is directly grounded, and which amplifier includes an unbypassed cathode resistor in a circuit common to the control grid and plate or anode circuits thereby to minimize the input capacity variation caused by the AVC action.

Still another object of this invention is to ground the cathode of a high frequency signal amplifier tube of the type including an unbypassed cathode resistor, the grounding of the cathode making it possible to use a filament type tube, or to use the type of pentode tube whose suppressor grid is internally connected to the cathode, or to use the type of tube where it is desirable internally to connect the shell, or an internal shield, to the cathode.

Still other objects of my invention are generally to improve the usefulness and efficiency of amplifier circuits of the unbypassed cathode resistor type, and to accomplish this object with economy.

Still other features and objects of my invention will best be understood by reference to the following description, taken in connection with the drawing, in which I have indicated diagrammatically two circuit organizations whereby my invention may be carried into effect.

In the drawing—

Figure 1:
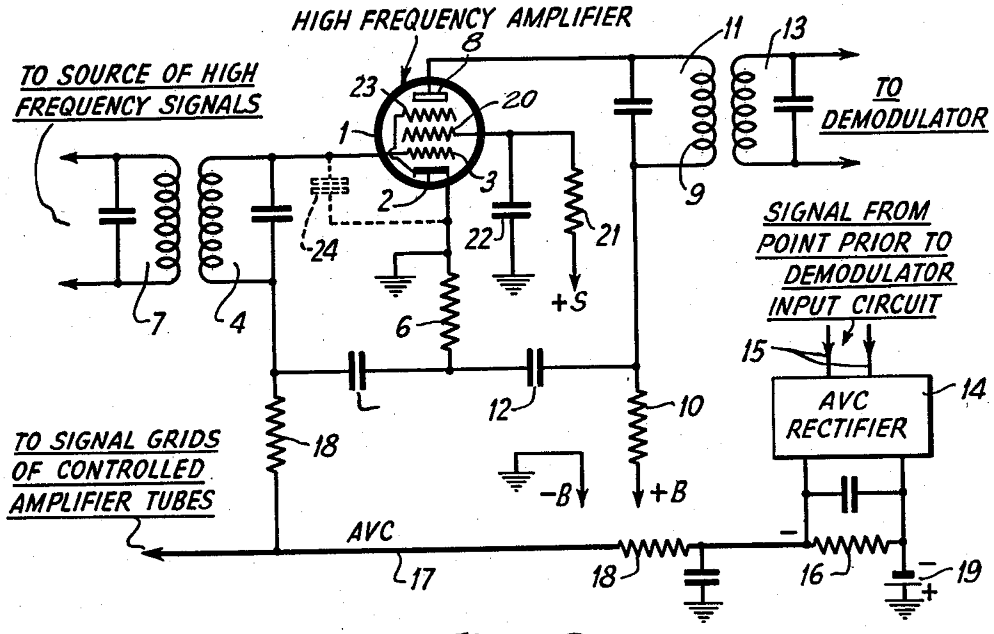
Fig. 1 shows a circuit diagram of a preferred embodiment of the invention.

Referring now to the accompanying drawing, wherein corresponding reference numerals indicate similar circuit elements throughout the figures, I have shown in Fig. 1 a high frequency signal amplifier circuit whose input and output networks are each tuned to a predetermined high frequency carrier frequency. It is to be understood that the circuit may be included in either an amplitude modulated (AM) or frequency modulated (FM) carrier wave receiving system. While my invention is readily adapted for FM or AM reception in the presently assigned respective bands of 88–108 mc. and 550–1700 kc., it is to be clearly understood that the present invention is not limited to amplifiers operated in such specific frequency bands.

For the particular purpose of the present application let it be assumed that the invention is embodied in an AM receiving system of the superheterodyne type, as is the usual practice at present, and that the amplifier circuit shown is embodied in the intermediate frequency (I. F.) signal amplifier network of the receiving system. In the case of AM reception the assigned transmission channels are 10 kc. wide, while the carrier wave is modulated in amplitude in accordance with the modulation signals. The selective radio frequency amplifier is generally followed by a mixer or frequency converter and I. F. amplifier network in cascade. Each of these networks is, of course, provided with suitable AM wave selector circuits. In the case of AM reception, the received AM waves are usually reduced to an I. F. value of 455 kc., the latter frequency being illustrative and being commonly employed in AM broadcast receivers of the superheterodyne type.

The I. F. signal amplifier network has one or more stages of amplification, and in Fig. 1 I have shown one of the I. F. signal amplifier circuits. The invention will be described in connection with that particular circuit. However, it is to be clearly understood that the invention is equally applicable to any amplifier stage prior to the demodulator of the receiving system. The demodulator is not shown, since any suitable device may be employed to provide the modulation signals which will be fed to a reproducer, such as a loud speaker, after suitable modulation amplification.

The high frequency amplifier tube 1, in this case an I. F. amplifier tube, is shown as of the pentode type. Specifically, tube 1 is of the heater cathode type, or it may be the type of tube wherein the suppressor grid is directly connected to the cathode, assuming the cathode is indirectly heated by a heater element. The cathode of the tube 1 is shown connected directly to ground. Where the receiver is battery operated, the cathode 2 is a filament one end of which is directly grounded. The signal input, or control, grid 3 is connected to the high signal potential side of the selective input circuit 4, and the low signal potential side of circuit 4 is connected through the high frequency bypass condenser 5 to the lower end of the unbypassed cathode resistor 6. The upper end of resistor 6 is connected to the grounded cathode 2. The resistor 6 may have a value of from 50 to 200 ohms, depending on the tube used.

The input circuit 4 is coupled to the resonant circuit 7 which may be arranged in the plate circuit of a prior I. F. amplifier tube, or a converter tube. The plate 8 of tube 1 is connected to the +B terminal of the direct current energizing source (not shown) through a path consisting of primary coil 9 and resistor 10. The coil 9 is included in the resonant output circuit 11 which is tuned to the operating I. F. value. I. F. bypass condenser 12 connects the ungrounded end of resistor 6 to the low potential side of output circuit 11. The resonant circuit 13, tuned to the I. F. value, is coupled to the output circuit 11, and feeds one or more I. F. amplifiers followed by the demodulator. Condensers 5 and 12 should have a reasonably low impedance at the I. F.

The use of AVC is well known, and indeed wide spread in the case of radio receiver systems. Hence, I have depicted the AVC system in a schematic manner. Usually a suitable detector, or rectifier, device derives I. F. signals from any desired point prior to the demodulator input circuit, and produces a rectified control voltage. In Fig. 1 I have indicated the rectangle 14 as the AVC rectifier, and it is to be clearly understood that the connections 15 are made to any desired point between circuit 13 and the demodulator input circuit. The load resistor 16, suitably bypassed for I. F. currents, has the negative end thereof connected to the low potential end of circuit 4 through AVC lead 17 which preferably includes suitable filter resistors 18. The line 17 may be connected to the signal grids of prior high frequency amplifiers which are to be regulated in gain.

If desired, there may be included a source 19 of negative bias between ground and the positive end of resistor 16. Since cathode 2 is grounded, the source 19 will provide a normal, or no-signal, grid bias for control grid 3. The source 19 may be a portion of the power supply network. The remaining electrodes of tube 1 are connected as shown. The screen grid 20 is connected through a resistor 21 to a positive voltage point +S of the direct current supply system of the receiver, the condenser 22 bypassing screen 20 to ground. Suppressor grid 23 is connected internally to the cathode 2. The dotted line capacity 24 denotes the inherent control grid to cathode capacity of tube 1, i. e., the input capacitance of the amplifier tube which affects the shape of the selectivity curve when the grid bias is varied by AVC action. It is to be clearly understood that the AVC voltage may be provided by any suitable means responsive to carrier amplitude variation. For example, in both AM and FM receivers the AVC voltage may be taken directly from the demodulator circuit per se.

The AVC circuit acts to vary the gain of each controlled amplifier tube in a sense to compensate for relatively slow carrier amplitude variation at the signal collector device thereby to maintain the carrier amplitude at the demodulator input circuit substantially uniform over a wide range of carrier amplitude variation at the signal collector device. The grid to cathode capacitance 24 seems to be dependent in part on the density of the electron cloud in the space between grid 3 and cathode 2. Obviously this density, and hence the magnitude of capacitance 24, changes with bias change at grid 3. Any change in magnitude of capacitance 24 (with resistor 6 shorted) causes a change in the selectivity of the circuit 4. The circuit 4 will be considerably detuned with extreme values of AVC bias, and with high intermediate frequency amplifiers, the loading of circuit 4, by the tube, will also be changed.

The unbypassed cathode resistor 6 puts a component of the plate current into the signal grid circuit of such sense and amplitude as to reduce the detuning effect of the capacitance 24. So far as the radio frequency currents are concerned, the grounding of the cathode end of resistor 6 instead of the opposite end does not affect the operation. There is developed across resistor 6 an I. F. voltage which is applied in degenerative sense to signal grid 3 thereby to prevent changes in the selectivity curve of network 7, 4 when the value of capacitance 24 changes due to AVC action. With high frequency amplifiers, the resistor 6 also reduces the loading of circuit 4 by the input conductance of the tube, and makes the variations of this loading with AVC much less.

There is a decided advantage in grounding the cathode directly so far as the value of AVC bias is concerned. The AVC voltage required to control a strong signal will be less, because no direct current flows through resistor 6. The direct current of tube 1 flows from cathode 2 directly to the grounded side of the direct current supply source. A somewhat higher value of resistor 6 may have to be used, if the screen 20 is bypassed to ground, because screen current will not flow through the resistor 6.

The path for radio frequency components of the plate of tube 1, starting at the cathode, is through the tube (via the electron stream) to the plate, through he circuit 11, through the capacitor 12, through the resistor 6 to cathode. The ground might be placed at any position in the circuit, without changing this path (except for secondary effects). The same sort of path is followed in the grid side. The resistor 6 is the impedance common to the two circuits. No matter which end of the resistor 6 is connected to ground, the radio frequency component of the plate current will produce a voltage across this resistor, which voltage is thus introduced into the grid circuit. The radio frequency component of the screen grid current, however, does not flow through this resistor, and since the screen current is generally about ⅓ of the plate current, the resistor will have to be about ⅓ larger to produce the same degenerative voltage as when the screen current does flow through the resistor.

Obviously, the tube envelope can be connected internally to cathode 2 where the envelope is metallic, and the suppressor is readily internally tied to the cathode. There will, also, be less chance of radio frequency currents leaking out through the cathode to heater element capacity, where an indirectly heated cathode is employed.

Figure 2:
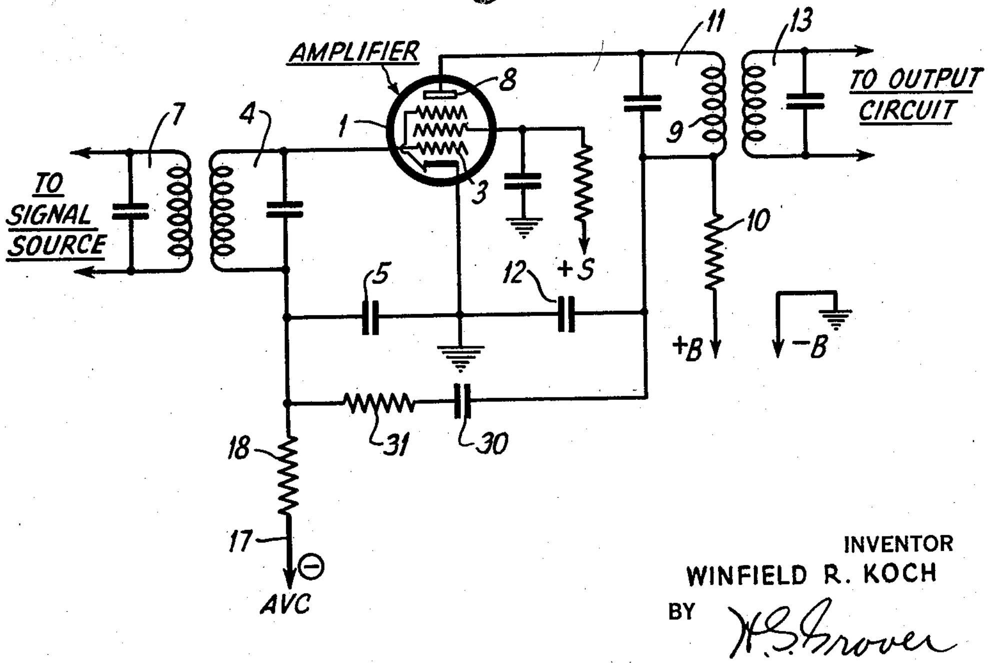
Fig. 2 shows a modification of the controlled high frequency amplifier circuit.

In Fig. 2 I have shown an alternative embodiment of the invention. Here the cathode 2 is directly grounded, and the compensation radio frequency component is injected into the control grid circuit by means of condenser 30 and resistor 31 connected in series between the lower end of coil 9 and the low potential side of input circuit 4. This circuit is not as desirable as that of Fig. 1 since it uses an extra capacitor, while the others must be kept to a given tolerance.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In an amplifier of high frequency signals: an electron discharge tube having at least a cathode, control grid and plate; energizing means applying a positive voltage to the plate; said cathode being grounded, a high frequency parallel resonant signal input circuit having a connection to the control grid; gain control means for applying a variable bias to the control grid; an unbypassed resistor having one end thereof connected to the grounded cathode; and respective capacitative paths from the ungrounded end of the resistor to the low signal potential sides of each of said input circuit and plate circuit.

2. In a variable-gain signal amplifier, an electron tube having at least a cathode, a control grid and an anode, said cathode being grounded, a resonant input circuit having a connection to said control grid, gain control means connected to said input circuit for applying a variable bias voltage to said control grid, a resonant output circuit having a connection to said anode, an impedance means connected between each of the low signal potential ends of said input resonant circuit and said output resonant circuit and signal ground, and a degenerative feedback circuit connected between the junctions of said impedance means and said resonant circuits, whereby the effect of input capacitance variation caused by changes in the control grid bias voltage under the control of the automatic gain control is diminished.

3. In a variable-gain signal amplifier, the combination as defined in claim 2, wherein said degenerative feedback circuit comprises a resistor capacitor network.

4. In a variable-gain signal amplifier, the combination as defined in claim 2, wherein said degenerative feedback circuit comprises a low pass resistor-capacitor pi-section network.

5. In a variable-gain signal amplifier, the combination as defined in claim 2, wherein said degenerative feedback circuit comprises a high pass resistor-capacitor T-section network.

WINFIELD R. KOCH.

REFERENCES CITED

The following references are of record in the file of this patent:

UNITED STATES PATENTS

| Number | Name | Date |
|---|---|---|
| 2,098,950 | Black | Nov. 16, 1937 |
| 2,173,426 | Scott | Sept. 19, 1939 |
| 2,179,956 | Roberts | Nov. 14, 1939 |
| 2,213,591 | Plebanski | Sept. 3, 1940 |
| 2,250,829 | Foster | July 29, 1941 |
| 2,262,916 | Boucke | Nov. 18, 1941 |
| 2,315,043 | Boucke | Mar. 30, 1943 |
| 2,420,249 | Korman | May 6, 1947 |